US012682071B2

(12) United States Patent
Peng et al.

(10) Patent No.: US 12,682,071 B2
(45) Date of Patent: Jul. 14, 2026

(54) SOFTWARE SECURITY DEFECT PREDICTION METHODS AND DEVICES

(71) Applicant: Siemens Aktiengesellschaft, Munich (DE)

(72) Inventors: Fei Peng, Beijing (DE); Fang Zhao, Beijing (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 198 days.

(21) Appl. No.: 18/292,456

(22) PCT Filed: Jul. 29, 2021

(86) PCT No.: PCT/CN2021/109338
§ 371 (c)(1),
(2) Date: Jan. 26, 2024

(87) PCT Pub. No.: WO2023/004701
PCT Pub. Date: Feb. 2, 2023

(65) Prior Publication Data
US 2024/0378297 A1 Nov. 14, 2024

(51) Int. Cl.
*G06F 21/57* (2013.01)
*G06F 11/3604* (2025.01)

(52) U.S. Cl.
CPC ........ *G06F 21/577* (2013.01); *G06F 11/3604* (2013.01); *G06F 2221/033* (2013.01)

(58) Field of Classification Search
CPC .... G06F 21/577; G06F 11/36; G06F 11/3604; G06F 2221/033; G06N 3/045; G06N 3/08
See application file for complete search history.

(56) References Cited

U.S. PATENT DOCUMENTS 8,832,662 B2 * 9/2014 Eade .................. G06F 11/3696 717/126
10,423,518 B2 * 9/2019 David ...................... G06F 8/77
(Continued)

FOREIGN PATENT DOCUMENTS

CN 108 446 213 8/2018 ............. G06F 11/36
CN 110 515 836 11/2019 ............. G06F 11/36
(Continued)

OTHER PUBLICATIONS

F. Arcelli Fontana, V. Ferme, M. Zanoni and A. Yamashita, "Automatic Metric Thresholds Derivation for Code Smell Detection," 2015 IEEE/ACM 6th International Workshop on Emerging Trends in Software Metrics, Florence, Italy, 2015, pp. 44-53, doi: 10.1109/WETSOM.2015.14. (Year: 2015).*
(Continued)

*Primary Examiner* — Catherine Thiaw
*Assistant Examiner* — Amir Mahdi Hajiabbasi
(74) *Attorney, Agent, or Firm* — Slayden Grubert Beard PLLC

(57) ABSTRACT

Teachings of the present disclosure include software security flaw prediction methods. An example method includes: scanning a segment of software source code to obtain a quantity of each error-prone mode present; determining a probability of violating each secure programming rule, based on the number of occurrences of each mode; predicting a probability of each security flaw based on the probability of the software source code violating each secure programming rule; acquiring each item of alert information obtained by analysis using a static code scanning tool, wherein an item of alert information indicates that a security flaw might occur in the software source code; and determining a probability of each item of alert information indicating a true security flaw, according to the probability
(Continued)

of each security flaw potentially present in the software source code.

9 Claims, 4 Drawing Sheets

(56) References Cited

U.S. PATENT DOCUMENTS

| | | | | |
|---|---|---|---|---|
| 11,593,675 | B1 * | 2/2023 | Garg | G06F 21/54 |
| 2011/0314450 | A1 * | 12/2011 | Shochat | G06F 11/3604<br>717/124 |
| 2012/0017280 | A1 * | 1/2012 | Wiegenstein | G06F 21/577<br>726/25 |
| 2012/0110551 | A1 * | 5/2012 | Fink | G06F 9/44589<br>717/128 |
| 2012/0266247 | A1 * | 10/2012 | Guy | G06F 21/577<br>726/25 |
| 2016/0110549 | A1 * | 4/2016 | Schmitt | G06F 8/77<br>726/25 |
| 2016/0335168 | A1 * | 11/2016 | Freiberg | G06F 11/3604 |
| 2019/0391903 | A1 | 12/2019 | Muske | G06F 11/36 |
| 2020/0175172 | A1 * | 6/2020 | Parsons | G06F 21/577 |
| 2020/0401702 | A1 | 12/2020 | Karabatis et al. | |
| 2021/0256426 | A1 * | 8/2021 | Calvano | G06N 3/0499 |
| 2021/0303696 | A1 * | 9/2021 | Weber | G06F 21/577 |
| 2021/0357307 | A1 * | 11/2021 | Deng | G06N 3/088 |
| 2022/0179773 | A1 | 6/2022 | Peng et al. | |
| 2024/0289255 | A1 * | 8/2024 | Mendelowitz | G06F 21/577 |

FOREIGN PATENT DOCUMENTS

| | | | |
|---|---|---|---|
| CN | 111 913 872 | 11/2020 | G06F 11/36 |
| EP | 3716113 A1 * | 9/2020 | G06F 21/577 |
| WO | 2020/191627 A1 | 10/2020 | G06F 11/36 |

OTHER PUBLICATIONS

A. Gong, Y. Zhong, W. Zou, Y. Shi and C. Fang, “Incorporating Android Code Smells into Java Static Code Metrics for Security Risk Prediction of Android Applications,” 2020 IEEE 20th International Conference on Software Quality, Reliability and Security (QRS), Macau, China (Year: 2020).*

L. Ruggahakotuwa, L. Rupasinghe and P. Abeygunawardhana, “Code Vulnerability Identification and Code Improvement using Advanced Machine Learning,” 2019 International Conference on Advancements in Computing (ICAC) (Year: 2019).*

Behjat Soltanifar, Shirin Akbarinasaji, Bora Caglayan, Ayse Basar Bener, Asli Filiz, and Bryan M. Kramer. 2016. Software Analytics in Practice: A Defect Prediction Model Using Code Smells. In Proceedings of the 20th International Database Engineering & Applications Symposium (IDEAS ’16) (Year: 2016).*

Joonseok Yang, Duksan Ryu and Jongmoon Baik, “Improving vulnerability prediction accuracy with Secure Coding Standard violation measures,” 2016 International Conference on Big Data and Smart Computing (BigComp), Hong Kong, China, 2016, pp. 115-122, doi: 10.1109/BIGCOMP.2016.7425809. (Year: 2016).*

Extended European Search Report, Application No. 21951308.2, 9 pages, Nov. 25, 2024.

Search Report for International Application No. PCT/CN2021/109338, 9 pages, Apr. 25, 2022.

* cited by examiner

SOFTWARE SECURITY DEFECT PREDICTION METHODS AND DEVICES

CROSS-REFERENCE TO RELATED APPLICATIONS

This application is a U.S. National Stage Application of International Application No. PCT/CN2021/109338 filed Jul. 29, 2021, which designates the United States of America, the contents of which are hereby incorporated by reference in their entirety.

TECHNICAL FIELD

The present disclosure relates to software security. Various embodiments of the teachings herein include software security flaw prediction methods and/or apparatus.

BACKGROUND

As computer and internet technologies have developed, IT technology with software at its core has already been widely applied in various aspects of society and life, bringing huge convenience to people. At the same time, the amounts of information and data that are exchanged and transmitted with the aid of computer networks are rapidly growing. This information and data directly concerns people's property, privacy and other rights and interests, so leakage or theft thereof might have very serious consequences. Thus, the issue of how to ensure information security has become a challenge that the software industry must deal with.

The results of assessment by research bodies show that about 82% of security loopholes are caused by coding. Thus, reviewing and checking the security of software code and identifying possible security flaws in code are important means of ensuring software security. In practice, most conventional software research and development organizations use the method of manual review, with quality managers, security specialists or experienced technical personnel within the team being responsible for assessing code security. This method has a relatively high cost in terms of human labor, and in particular will take up a lot of the time of key technical personnel, so is often very difficult to implement effectively in real projects.

In recent years, with the rise of agile development, the use of static scanning tools to realize automated code checking in the process of continued integration, construction and publication of software has become the currently most popular way of reviewing software code. Such a method can theoretically solve the problems of high cost and low efficiency that are associated with manual review, but it also has its own shortcomings, the main two being a high false report rate and an excessive number of flaw alerts. For example, statistics for a well-known open source code dataset (Software Assurance Reference Dataset, SARD) are shown below:

| | Software combination analysis (SCA) tool | | |
|---|---|---|---|
| | Klocwork | Coverity | CppTest |
| Total no. of flaw alerts | 36383 | 30698 | 86962 |
| No. of SARD flaws found | 5092 | 7454 | 3027 |
| True alert ratio | 14.0% | 24.3% | 3.5% |

Here, 3 mainstream static scanning tools were used to check for security flaws in software code in SARD. The total number of alerts issued by each tool was far greater than the number of true flaws detected by it, so accuracy was very low. Clearly, such a checking result cannot be used directly, and a large amount of manpower resources still needs to be committed for review, eliminating false reports, and seeking out true code flaws. As a result, the advantages of automation and high efficiency which should have been associated with the use of a tool to review code security are severely lessened.

SUMMARY

Embodiments of the teachings of the present disclosure include software security flaw prediction methods and apparatus. For example, some embodiments include a software security flaw prediction method wherein a number of occurrences of each error-prone mode present in a segment of software source code obtained by scanning with a code scanning tool is acquired, a probability of the software source code violating each secure programming rule is determined according to the number of occurrences of each error-prone mode, and a probability of each security flaw that might be present in the software source code is predicted according to the probability of the software source code violating each secure programming rule; furthermore, each item of alert information obtained by analysis of the software source code by a static code scanning tool is acquired, wherein an item of alert information is used to indicate that a security flaw might occur in the software source code; and then a probability of each item of alert information indicating a true security flaw is determined, according to the probability, obtained by prediction, of each security flaw that might be present in the software source code.

As another example, some embodiments include an apparatus comprising modules for performing one or more of the methods described herein.

As another example some embodiments include an apparatus comprising: at least one memory, configured to store computer-readable code; at least one processor, configured to call the computer-readable code, to perform one or more of the methods described herein.

As another example, some embodiments include a computer-readable medium having stored thereon computer-readable instructions which, when executed by a processor, cause the processor to perform one or more of the methods described herein.

KEY TO THE DRAWINGS

Figure 1:
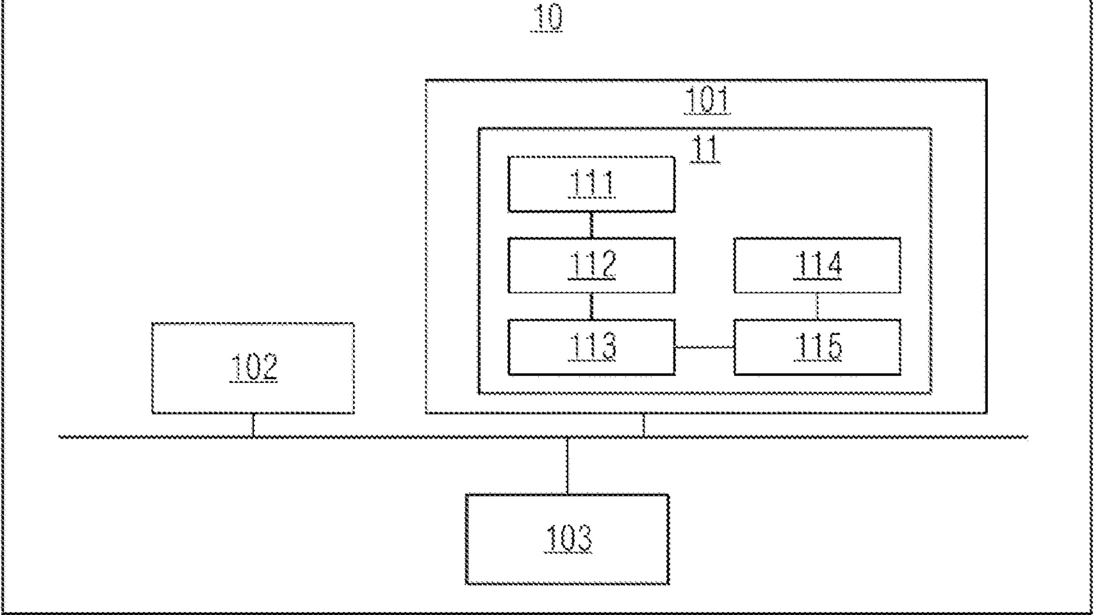
FIG. 1 is a structural schematic diagram of an example software security flaw prediction incorporating apparatus teachings of the present disclosure.

10: software security flaw prediction apparatus
101: memory
102: processor
103: communication interface
11: software security flaw prediction program
111: code scanning module
112: first processing module
113: second processing module
114: information acquisition module
115: third processing module
200: software security flaw prediction method
S101-S205: method steps
30: software source code to be analysed
41: number of occurrences of each error-prone mode
42: probability of software source code 30 violating each secure programming rule
43: probability of each security flaw that might be present in software source code 30
44: alert information
45: probability of alert information 44 indicating true security flaw
51: first neural network model
52: second neural network model
60: static code scanning tool

DETAILED DESCRIPTION

The teachings of the present disclosure may be used to effectively solve certain problems associated with static code scanning tools, specifically an excessive number of security flaw alerts and a high false report rate. By assessing the degree to which the code complies with a secure programming norm or standard, it is possible to predict the possibility that a related security flaw will occur in the code, and compare this with a checking result of a static code scanning tool to determine consistency therewith, so as to assess the accuracy of the checking result.

In some embodiments, the number of occurrences of each error-prone mode may be inputted into a pre-trained first neural network model, to obtain the probability, outputted by the first neural network model, of the software source code violating each secure programming rule, wherein the first neural network model is used to indicate a relationship between the number of occurrences of each error-prone mode and the probability of each secure programming rule being violated. The probability of the software source code violating each secure programming rule may be inputted into a pre-trained second neural network model, to obtain the probability, outputted by the second neural model, of occurrence of each security flaw that might be present in the software source code, wherein the second neural network model is used to indicate a relationship between the probability of each secure programming rule being violated and the probability of each flaw.

Due to the use of a neural network model, training data can be collected from projects of different types, these projects having completely different characteristics. Thus, after training, the artificial neural network model reflect project can characteristics in different industries, different development processes and different situations. That is to say, the fully trained model can be very flexible and have a high degree of expandability, and can be used to analyse projects of different types, without the need to perform pre-configuration according to project characteristics, because all of the non-linear mappings indicated by the model come from learning of training data. Another advantage of using a neural network model is the ability to update the model's internal parameters through a continual learning and training process, so as to dynamically adjust and adapt to new data inputs. Thus, after being actually deployed, the model can be trained by continually accumulated data, so that the prediction result becomes more and more accurate.

In some embodiments, if the probability, obtained by prediction, of occurrence of a security flaw that might be present in the software source code is high, and alert information indicating that said security flaw might occur in the software source code is obtained through analysis of the software source code using the static code scanning tool, then it is determined that the probability of the alert information indicating a true security flaw is high.

By performing overall analysis of the software source code, the probability of each security flaw occurring therein is obtained by prediction, and then the static code scanning tool is used to obtain alert information regarding the occurrence of a security flaw in the portion of code; this assists in judging the probability of the alert information indicating a true security flaw. That is, when the predicted probability of a particular security flaw occurring is high and the static scanning tool produces alert information for this security flaw, the probability of the alert information indicating a true security flaw is high.

The subject matter described herein will now be discussed with reference to exemplary embodiments. It should be understood that these embodiments are discussed merely in order to enable those skilled in the art to better understand and thereby implement the subject matter described herein, without limiting the protection scope, applicability or examples expounded in the claims. Changes may be made to the functions and arrangement of the discussed elements without departing from the protection scope of the present disclosure. Various processes or components may be omitted from, replaced in or added to the examples as required. For example, the method described may be performed in a different order from that described, and various steps may be added, omitted or combined. Furthermore, features described in relation to some examples may also be combined in other examples.

As used herein, the term "comprises" and variants thereof denote open terms, meaning "including but not limited to". The term "based on" means "at least partly based on". The terms "one embodiment" and "an embodiment" mean "at least one embodiment". The term "another embodiment" means "at least one other embodiment". The terms "first", "second", etc. may denote different or identical objects. Other definitions may be included below, whether explicit or implicit. Unless clearly specified in the context, the definition of a term is the same throughout the description.

Example embodiments of the teachings of the present disclosure are described in detail below with reference to FIGS. 1-6. FIG. 1 is a structural schematic diagram of an example software security flaw prediction apparatus incorporating teachings of the present disclosure. The software security flaw prediction apparatus 10 may be realized as a network of computer processors, to perform one or more of the example software security flaw prediction method 200 incorporating teachings of the present disclosure, or may be a single computer, a single-chip microcomputer or a processor chip as shown in FIG. 1, and comprises at least one memory 101, which comprises a computer-readable medium, such as a random access memory (RAM). The apparatus 10 further comprises at least one processor 102 coupled to the at least one memory 101. Computer-executable instructions are stored in the at least one memory 101, and when executed by the at least one processor 102, can cause the at least one processor 102 to perform the steps described herein.

The at least one memory 101 shown in FIG. 1 may contain a software security flaw prediction program 11, causing the at least one processor 102 to perform one or more of the software security flaw prediction methods 200 described herein. As shown in FIG. 1, the software security flaw prediction program 11 may comprise:

- a code scanning module 111, configured to scan a segment of software source code 30, to obtain a number 41 of occurrences of each error-prone mode present in the software source code 30;
- a first processing module 112, configured to determine a probability 42 of the software source code 30 violating each secure programming rule, according to the number 41 of occurrences of each error-prone mode;
- a second processing module 113, configured to predict a probability 43 of each security flaw that might be present in the software source code 30, according to the probability 42 of the software source code 30 violating each secure programming rule;
- an information acquisition module 114, further configured to acquire each item of alert information 44 obtained by analysis of the software source code 30 by a static code scanning tool 60, wherein an item of alert information 44 is used to indicate a security flaw that might occur in the software source code 30;
- a third processing module 115, configured to determine a probability 45 of each item of alert information 44 indicating a true security flaw, according to the probability 43, obtained by prediction, of each security flaw that might be present in the software source code 30.

In some embodiments, the first processing module 112 is specifically configured to: input the number 41 of occurrences of each error-prone mode into a pre-trained first neural network model 51, to obtain the probability 42, outputted by the first neural network model 51, of the software source code 30 violating each secure programming rule, wherein the first neural network model 51 is used to indicate a relationship between the number of occurrences of each error-prone mode and the probability of each secure programming rule being violated.

In some embodiments, the second processing module 113 is specifically configured to: input the probability 42 of the software source code 30 violating each secure programming rule into a pre-trained second neural network model 52, to obtain the probability 43, outputted by the second neural model 52, of occurrence of each security flaw that might be present in the software source code 30, wherein the second neural network model 52 is used to indicate a relationship between the probability of each secure programming rule being violated and the probability of each flaw.

In some embodiments, the third processing module 115 is specifically configured to: if the probability 43, obtained by prediction, of occurrence of a security flaw that might be present in the software source code 30 is high, and alert information 44 indicating that said security flaw might occur in a portion of the software source code 30 is obtained through analysis of the software source code 30 using the static code scanning tool 60, then determine that a probability of the alert information 44 indicating a true security flaw is high.

The abovementioned modules may also be regarded as functional modules realized by hardware, for realizing various functions involved when the software security flaw prediction apparatus 10 performs a software security flaw prediction method; for example, control logic of each process involved in the method is burnt into, for example, a field-programmable gate array (FPGA) chip or a complex programmable logic device (CPLD) in advance, and the function of each module mentioned above is performed by these chips or devices, wherein the specific manner of implementation may be decided according to engineering practice.

In some embodiments, the software security flaw prediction apparatus 10 may further comprise a communication interface 103, for communication between the software security flaw prediction apparatus 10 and other equipment.

In some embodiments, the apparatus may comprise an apparatus having a different architecture from that shown in FIG. 1. The architecture described above is merely exemplary, being used to explain the example software security flaw prediction methods 200 described herein.

The at least one processor 102 may comprise a microprocessor, an application-specific integrated circuit (ASIC), a digital signal processor (DSP), a central processing unit (CPU), a graphical processing unit (GPU), a state machine, etc. Embodiments of computer-readable media include but are not limited to floppy disks, CD-ROM, magnetic disks, memory chips, ROM, RAM, ASIC, configured processors, all-optical media, all magnetic tapes or other magnetic media, or any other media from which a computer processor can read instructions. In addition, various other forms of computer-readable media may send or carry instructions to a computer, including routers, private or public networks, or other wired and wireless equipment transmission or channels.

Instructions may include code of any computer programming language, including C, C++, C language, Visual Basic, Java and JavaScript.

Figure 2:
FIG. 2 is a flow chart of an example software security flaw prediction method incorporating teachings of the present disclosure.
Figure 2:
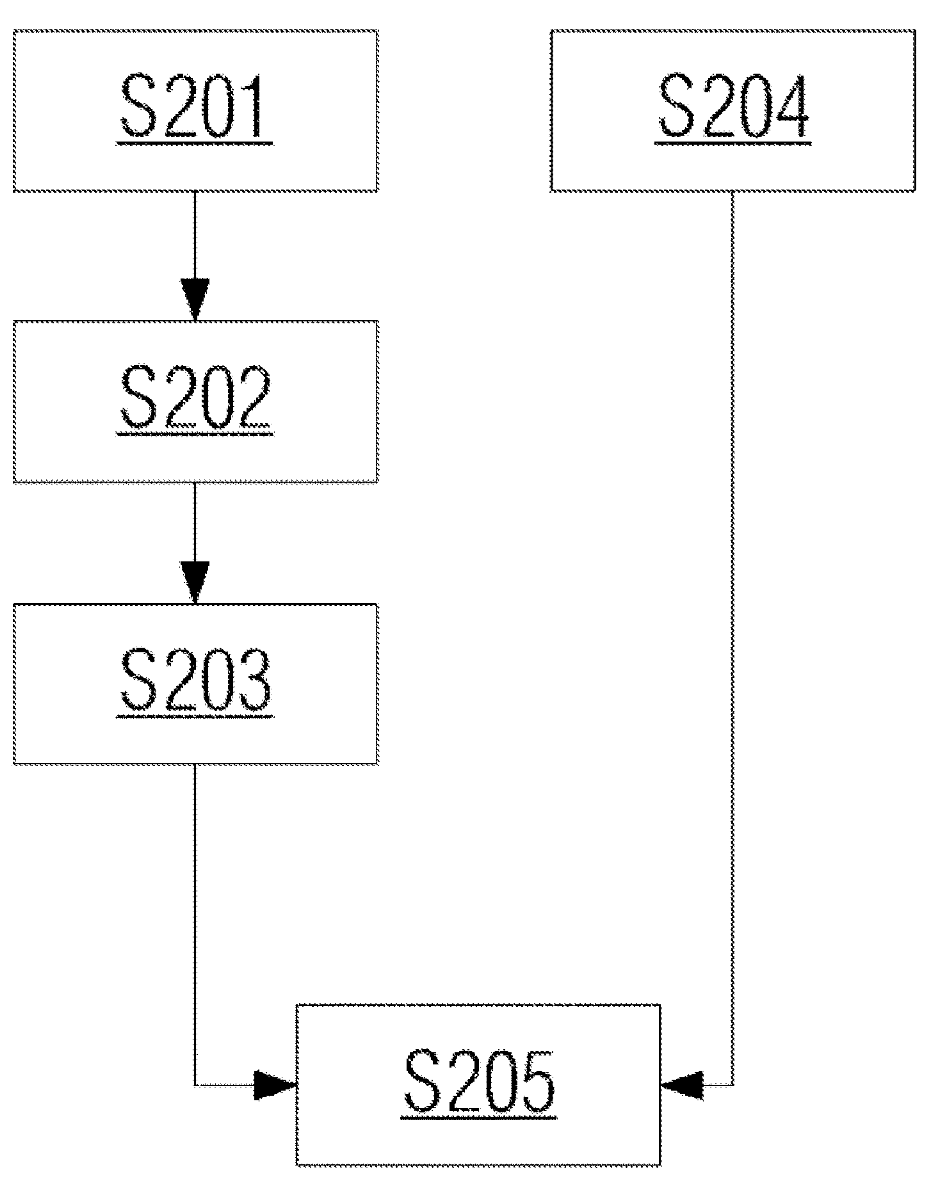
Figure 3:
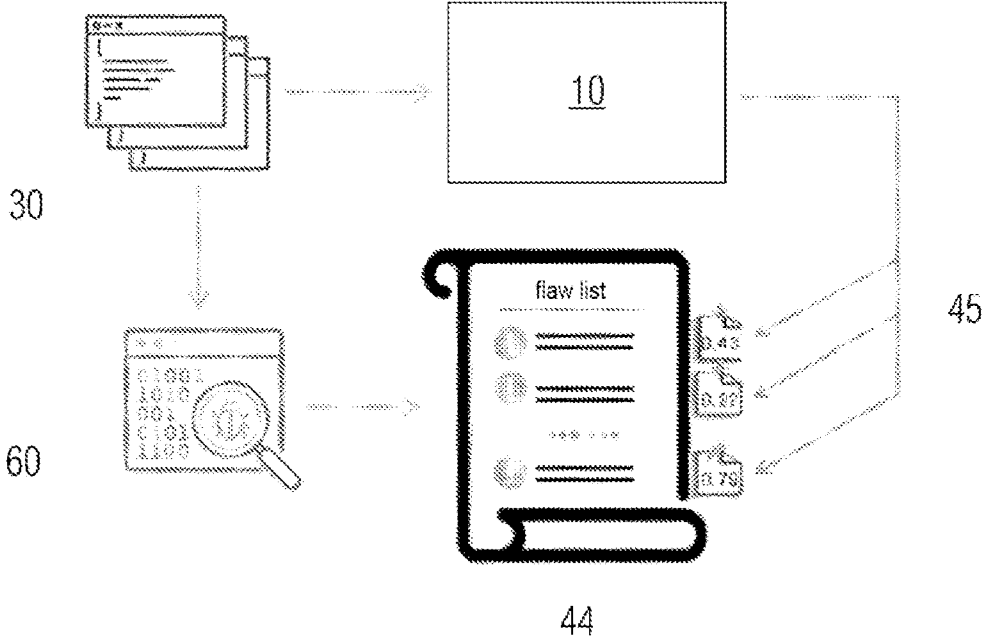
FIG. 3 shows an example process of performing software security flaw analysis incorporating teachings of the present disclosure.
Figure 4:
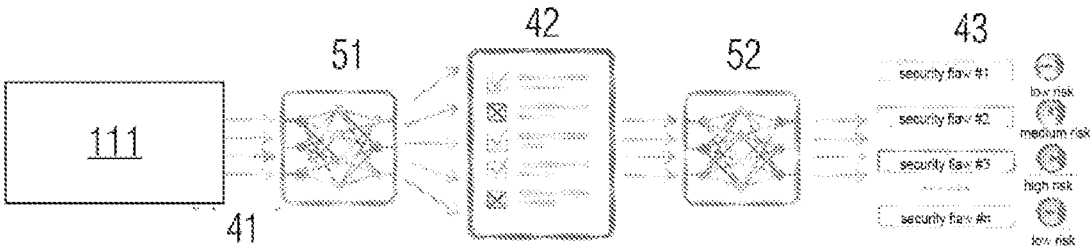
FIG. 4 shows an example process of using a neural network model to perform software security flaw analysis incorporating teachings of the present disclosure.

FIG. 2 is a flow chart of an example software security flaw prediction method provided in an embodiment of the present invention. The method 200 may be performed by the abovementioned software security flaw prediction apparatus 10, and may comprise the following steps:

- S201: scanning a segment of software source code 30, to obtain a number 41 of occurrences of each error-prone mode present in the software source code 30;
- S202: determining a probability 42 of the software source code 30 violating each secure programming rule, according to the number 41 of occurrences of each error-prone mode;
- S203: predicting a probability 43 of each security flaw that might be present in the software source code 30, according to the probability 42 of the software source code 30 violating each secure programming rule;
- S204: acquiring each item of alert information 44 obtained by analysis of the software source code 30 by a static code scanning tool 60, wherein an item of alert information 44 is used to indicate that a security flaw might occur in the software source code 30;
- S205: determining a probability 45 of each item of alert information 44 indicating a true security flaw, according to the probability 43, obtained by prediction, of each security flaw that might be present in the software source code 30.

The security flaw prediction apparatus 10 may regard the software source code 30 as an input, first detecting an error-prone mode (generally also called a bad code smell, being a diagnostic symptom indicating that a quality issue and security flaw might be present in the software design) in the software source code 30, the error-prone mode being associated with a secure programming rule, and then assessing the situation regarding compliance with the secure programming rule during development of the software source code 30 according to the frequency of occurrence and specific distribution of the error-prone mode. AI technology may then be used to associate the secure programming rule with the risk of a security flaw occurring, and the probability of a security flaw occurring in the source code may be estimated on the basis of the situation regarding compliance of the source code with the security rule.

Each of the steps above is described in detail below with reference to FIGS. 3-6.

S201: scanning a segment of software source code 30, to obtain a number 41 of occurrences of each error-prone mode present in the software source code 30. In step S201, the software source code 30 is scanned to obtain an error-prone mode. A tool such as SonarQube, Understand, Checkstyle, FindBugs, PMD or Fortify SCA may be used to scan the software source code 30, to obtain an error-prone mode of the software source code 30.

S202: determining a probability 42 of the software source code 30 violating each secure programming rule, according to the number 41 of occurrences of each error-prone mode. In step S202, the error-prone mode detected in step S201 is associated with a secure programming rule. Taking as an example the code checking tool SonarQube and the secure programming rule set CERT (published by the Software Engineering Institute of Carnegie Mellon University, and including versions of different programming languages such as C/C++/Java), the following table sets out the associations between error-prone modes which the SonarQube tool is able to detect and CERT C/C++ secure programming rules (SEI CERT C/C++ Coding Standard).

| Error-prone modes | Related CERT C/C++ rules |
| --- | --- |
| Resources should be closed | Input/output (FIO)/FIO42-C; close files when they are no longer needed |
| Dynamically allocated memory should be released | Memory management (MEM)/MEM31-C: free dynamically allocated memory when no longer needed |
| Appropriate memory de-allocation should be used | Memory management (MEM)/MEM51-CPP: properly de-allocate dynamically allocated resources |
| Freed memory should not be used | Expressions (EXP)/EXP54-CPP: Do not access an object outside of its lifetime<br>Memory management (MEM)/MEM50-CPP: Do not access freed memory |
| POSIX functions should not be called with arguments that trigger buffer overflows | Arrays (ARR)/ARR30-C: Do not form or use out-of-bounds pointers or array subscripts<br>Characters and strings (STR)/STR50-CPP: Guarantee that storage for strings has sufficient space for character data and the null terminator |
| Functions should not be defined with a variable number of arguments | Declarations and Initialization (DCL)/DCL50-CPP: Do not define a C-style variadic function |
| Memory access should be explicitly bounded to prevent buffer overflows | Arrays (ARR)/ARR30-C: Do not form or use out-of-bounds pointers or array subscripts<br>Characters and strings (STR)/STR50-CPP: Guarantee that storage for strings has sufficient space for character data and the null terminator |
| Objects with integer type should not be converted to objects with pointer type | Integers (INT)/INT36-C: Converting a pointer to integer or integer to pointer |
| The address of an automatic object should not be assigned to another object that may persist after the first object has ceased to exist | Declarations and Initialization (DCL)/DCL30-C: Declare objects with appropriate storage durations |
| "atof", "atoi" and "atol" from <stdlib.h> should not be used | Error Handling (ERR)/ERR34-C: Detect errors when converting a string to a number |

The error-prone modes and CERT C/C++ secure programming rules in the table above are all examples for illustration and are not a complete list. Here, the association between occurrence of an error-prone mode and violation of a CERT C/C++ secure programming rule might be any one of the following: the occurrence of a specific error-prone mode signifies that a CERT C/C++ secure programming rule might be violated; the occurrence of a specific multiple CERT C/C++ secure error-prone mode signifies that multiple programming rules might be violated; the occurrences of multiple different error-prone modes all signify that a CERT C/C++ secure programming rule might be violated.

Figure 5:
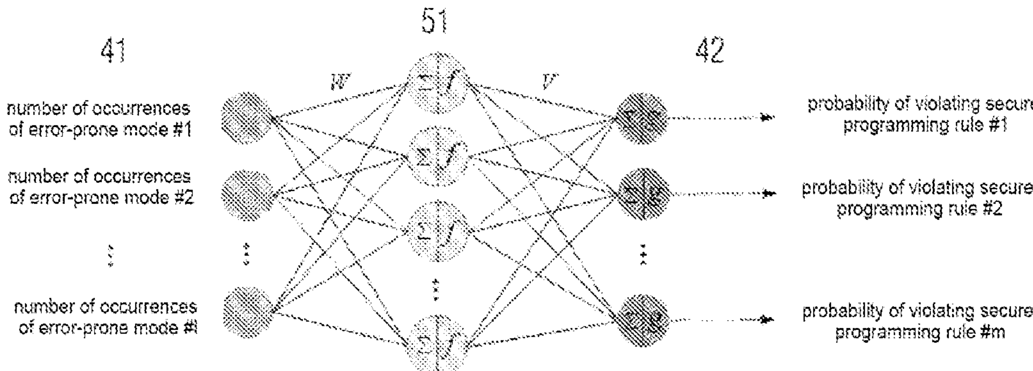
FIG. 5 shows an example process of using a first neural network model to obtain the probability of software source code violating a secure programming rule incorporating teachings of the present disclosure.
Figure 6:
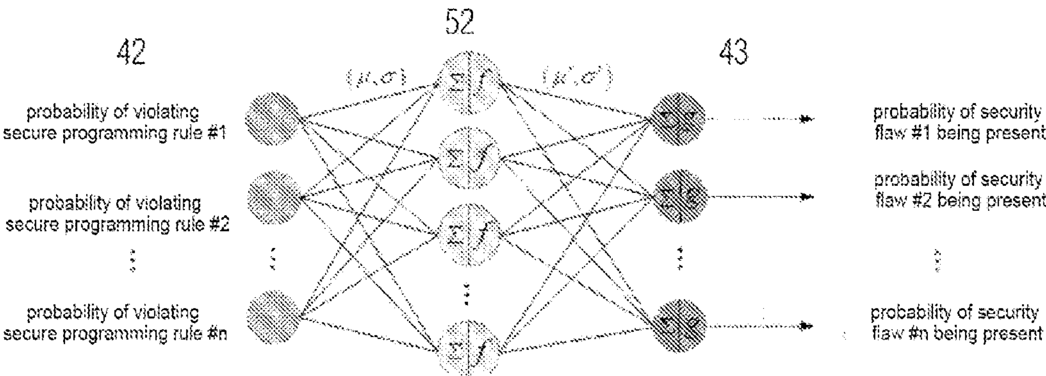
FIG. 6 shows an example process of using a second neural network model to obtain the probability of each security flaw being present in software source code incorporating teachings of the present disclosure.

To accurately reflect such a complex mapping relationship, some embodiments use an artificial intelligence (AI) algorithm, using the first neural network 51 shown in FIG. 5 to simulate the association between the occurrence of an error-prone mode and violation of a secure programming rule. In some embodiments, the first neural network 51 may be a back propagation (BP) neural network.

In some embodiments, the BP artificial neural network is an algorithmic model, formed of a large number of interconnected nodes (also called neurons), and divided into an input layer at the left side, an output layer at the right side, and a hidden layer in the middle. The connection between each pair of nodes represents a weighting value, called a weight, for a signal passing through this connection. Each node of the hidden layer and the output layer corresponds to a specific output function, called an activation function. The significance of the model is based on the following assumption: there is a hidden non-linear equation, which can express an association between an inputted number of occurrences of an error-prone mode and an outputted probability of a secure programming rule being violated, wherein the coefficients in the non-linear equation are unknown. The model can be trained by means of a training dataset, continually updating internal parameters of the model iteratively, until the parameters adjusted through training are able to make the equation fit the association between the input and output accurately. At this time, these parameters embody the essential nature of the model, i.e. the link between the number of occurrences of an error-prone mode and the probability of a secure programming rule being violated.

In some embodiments, the model learning and training process may include two particular steps, specifically forward propagation of a signal and backward propagation of an error, the specific process being as follows:

During forward propagation, the numbers of occurrences of error-prone modes in the software source code 30 is used as an input signal at an input end of the model, expressed as an l-dimensional vector:

$$[C_1, C_2, \ldots, C_l]$$

where $C_1, C_2, \ldots, C_l$ denote the specific numbers of times that error-prone modes #1, #2, . . . , #l occur in a segment of source code.

The hidden layer of the model is responsible for receiving the input signal, extracting features, and transmitting to the output layer. Weight coefficients between the input layer and the hidden layer are represented by a matrix W, with elements $w_{ij}$ therein representing the weight between the ith node of the input layer and the jth node of the hidden layer. Taking the jth node of the hidden layer as an example, the input which it receives is the sum of the products of multiplying each of the nodes of the input layer connected thereto by its corresponding weight, i.e.

$$\sum_{i=1}^{l} c_i w_{ij}$$

where $c_i$ denotes the input signal corresponding to the ith node of the input layer. $w_{ij}$ denotes the weight between the ith node of the input layer and the jth node of the hidden layer.

Correspondingly, the output signal of this hidden layer node is the result of processing the input signal by the activation function of this hidden layer node, i.e.

$$f\left(\sum_{i=1}^{l} c_i w_{ij}\right)$$

where f represents the activation function corresponding to the hidden layer.

The output layer is responsible for receiving the signal transmitted out by the hidden layer, and outputting a final result. Weight coefficients between the hidden layer and the output layer are represented by a matrix V, with elements $v_{jk}$ therein representing the weight between node j of the hidden layer and node k of the output layer. Taking the kth node of the output layer as an example, the input which it receives is the sum of the products of multiplying the output of each of the nodes of the hidden layer connected thereto by its corresponding weight, i.e.

$$\sum_{j=1}^{J} v_{jk} f\left(\sum_{i=1}^{l} c_i w_{ij}\right)$$

where J is the number of hidden layer nodes, and $v_{jk}$ denotes the weight between node j of the hidden layer and node k of the output layer.

The output of the node is a prediction result of the model, e.g., the probability of a secure programming rule being violated. The mathematical representation thereof is:

$$g\left(\sum_{j=1}^{J} v_{jk} f\left(\sum_{i=1}^{l} c_i w_{ij}\right)\right)$$

where g represents the activation function corresponding to the output layer.

At this point, the forward propagation process of the network is complete. If the output result of the model does not agree with actual data, a back propagation process is initiated. The principle of back propagation is the process of transmitting, to the input layer, an output error of the model in a specific mathematical form via the hidden layer; the error is shared among all of the nodes, thus enabling the nodes to use a self-learning algorithm such as gradient descent to correct their own parameters according to the numerical measure of the error, so that the predicted value of the model can move closer and closer to the real data. Firstly, the error between the predicted value and actual data is defined at the output layer as:

$$E = \frac{1}{2}(d - O)^2 = \frac{1}{2}\sum_{k=1}^{m}(d_k - o_k)^2$$

where m is the number of neurons in the output layer, representing the total number of related CERT C/C++ secure programming rules; d is the desired output, signifying whether a CERT C/C++ rule really has been violated in a code segment to be analysed at the present time; and o is the actual output of the model, i.e. the prediction made by the model at the present time, according to the input data, regarding the probability of a CERT C/C++ secure programming rule being violated in the code segment.

The error definition above is expanded to the hidden layer nodes, to obtain the following result:

$$E = \frac{1}{2}\sum_{k=1}^{m}\left[d_k - g\left(\sum_{j=0}^{J} v_{jk} y_j\right)\right]^2$$

where $y_j$ is the output of the jth node of the hidden layer; and further expanding to the input layer, the result is:

$$E = \frac{1}{2}\sum_{k=1}^{m}\left[d_k - g\left(\sum_{j=0}^{J} v_{jk} f\left(\sum_{i=0}^{l} c_i w_{ij}\right)\right)\right]^2$$

The formula above shows that the prediction error of the model is a function of the weight coefficients $w_{ij}$ and $v_{jk}$, so the error can be changed by adjusting the weights. The principle of adjustment is to continually reduce the error, i.e. the amount by which the weight is adjusted is caused to be directly proportional to the gradient descent of the error, expressed as follows:

$$\triangle w_{ij} = -\eta\frac{\partial E}{\partial w_{ij}},\ i = 0, 1, 2, \ldots, l;\ \ j = 1, 2, \ldots, J.$$

$$\triangle v_{jk} = -\eta\frac{\partial E}{\partial v_{jk}},\ i = 0, 1, 2, \ldots, J;\ \ k = 1, 2, \ldots, m.$$

where the negative sign indicates gradient descent; and the constant $\eta \in (0,1)$ denotes the proportionality coefficient, reflecting the learning rate of the model. Thus, after this round of iterative adjustment, the matrix of weight parameters of the model will be updated to:

$$w'_{ij} = w_{ij} + \Delta w_{ij},\ v'_{jk} = v_{jk} + \Delta v_{jk},$$

$$i = 1, 2, \ldots\ l,\ j = 1, 2, \ldots, J,\ k = 1, 2, \ldots, m.$$

At this point, one full model training process is completed. This process of learning and training may be repeated multiple times, until the error in the model output is reduced to an acceptable level. At this time, the model and the parameters contained therein are able to fit, in a stable manner, a non-linear mapping relationship between the number of occurrences of an error-prone mode and violation of a CERT C/C++ security rule. Thereafter, if the number of occurrences of an error-prone mode in a code segment to be analysed is inputted into the model, the probability of a secure programming rule violation occurring therein can be predicted.

The SonarQube error-prone modes used at the input end of the abovementioned BP neural network and the corresponding CERT C/C++ rules at the output end are all examples; the model may also use error-prone modes identifiable by other static checking tools (e.g. Findbug, PMD, etc.) and rule lists of other secure programming standards (e.g. OWASP secure coding practices, etc.), to match the specific usage environments of different software development projects.

S203: predicting a probability 43 of each security flaw that might be present in the software source code 30, according to the probability 42 of the software source code 30 violating each secure programming rule. After obtaining the prediction result for the probability of a secure programming rule violation occurring in the software source code 30, the probability of a security flaw being present in the software source code 30 may be further predicted. In some embodiments, this may be achieved by establishing an association between a secure programming rule and a security flaw. Taking as an example the Common Weakness Enumeration, which is a classification and description of security flaws, the following table sets out the associations between some of the software security flaws in the CWE list and CERT C/C++ secure programming rules:

| CWE software flaws | Related CERT C/C++ rules |
|---|---|
| CWE-416. Use after free | Expressions (EXP)/EXP54-CPP: Do not access an object outside of its lifetime |
| | Input output (FIO)/FIO46-C: Do not access a closed file |
| | Memory management (MEM)/MEM50-CPP: Do not access freed memory |
| CWE-20. Improper input validation | Error handling (ERR)/ERR07-C: Prefer functions that support error checking over equivalent functions that don't |
| | Floating point (FLP)/FLP04-C: Check floating-point inputs for exceptional values |
| | Input output (FIO)/FIO30-C: Exclude user input from format strings |

-continued

| CWE software flaws | Related CERT C/C++ rules |
|---|---|
| | Integers (INT)/INT08-C: Verify that all integer values are in range |
| | Memory management (MEM)/MEM10-C: Define and use a pointer validation function |
| CWE-125. Out-of-bounds read | Arrays (ARR)/ARR30-C: Do not form or use out-of-bounds pointers or array subscripts |
| | Arrays (ARR)/ARR38-C: Guarantee that library functions do not form invalid pointers |
| | Expressions (EXP)/EXP39-C: Do not access a variable through a pointer of an incompatible type for character data and the null terminator |
| | Memory management (MEM)/MEM10-C: Define and use a pointer validation function |
| | Characters and strings (STR)/STR32-C: Do not pass a non-null-terminated character sequence to a library function that expects a string |
| | Characters and strings (STR)/STR50-CPP: Guarantee that storage for strings has sufficient space |
| | Characters and strings (STR)/STR53-CPP: Range check element access |
| CWE-787. Out-of-bounds write | Arrays (ARR)/ARR30-C: Do not form or use out-of-bounds pointers or array subscripts |
| | Arrays (ARR)/ARR38-C: Guarantee that library functions do not form invalid pointers |
| | Expressions (EXP)/EXP39-C: Do not access a variable through a pointer of an incompatible type |
| | Memory management (MEM)/MEM10-C: Define and use a pointer validation function |
| | Characters and strings (STR)/STR32-C: Do not pass a non-null-terminated character sequence to a library function that expects a string |
| | Characters and strings (STR)/STR50-CPP: Guarantee that storage for strings has sufficient space for character data and the null terminator |
| | Characters and strings (STR)/STR53-CPP: Range check element access |
| CWE-190. Integer overflow or wraparound | Integers (INT)/INT01-C: Use rsize_t or size_t for all integer values representing the size of an object |
| | Integers (INT)/INT18-C: Evaluate using explicit type conversion before comparing or assigning integer expressions to larger size |
| | Integers/INT30-C: Ensure that unsigned integer operations do not wrap |

-continued

| CWE software flaws | Related CERT C/C++ rules |
| --- | --- |
| | Memory management/MEM07-C: Ensure that the arguments to calloc( ) (the number and size of elements), when multiplied to calculate storage space, do not wrap |
| CWE-400. Uncontrolled resource consumption | Exceptions and error handling (ERR)/ERR57-CPP: Do not leak resources when handling exceptions |
| | Input output (FIO)/FIO51-CPP: Close files when they are no longer needed |
| | Memory management (MEM)/MEM11-C: Do not assume infinite heap space |
| | Memory management (MEM)/MEM31-C: Free dynamically allocated memory when no longer needed |
| | Memory management (MEM)/MEM51-CPP: Properly deallocate dynamically allocated resources |
| CWE-119. Improper restriction of operations within the bounds of a memory buffer | Expressions/EXP03-C: Do not assume the size of a structure is the sum of the sizes of its members |
| | Expressions (EXP)/EXP36-C: Do not cast pointers into more strictly aligned pointer types |
| | Expressions (EXP)/EXP39-C: Do not access a variable through a pointer of an incompatible type |
| | Expressions (EXP)/EXP53-CPP: Do not read uninitialized memory |
| | Characters and strings (STR)/STR11-C: Do not specify the bound of a character array initialized with a string literal |
| CWE-772. Missing release of resource after effective lifetime | Input output (FIO)/FIO22-C: Close files before spawning processes |
| | Input output (FIO)/FIO42-C: Close files when they are no longer needed |
| | Memory management (MEM)/MEM03-C: Clear sensitive information stored in reusable resources |
| | Memory management (MEM)/MEM31-C: Free dynamically allocated memory when no longer needed |

The abovementioned CWE security flaws and CERT C/C++ secure programming rules are all examples for illustration, and are not a complete list. Violation of a secure programming rule in code will not necessarily result in the occurrence of the security flaw associated therewith, but increases the probability of its occurrence; therefore, a Bayesian neural network (BNN) model with a probability distribution characteristic is more suitable for approximating this complex, many-to-many mapping relationship containing a probability characteristic. In some embodiments, may include using a BNN algorithm to fit the association between secure programming rule violations and security flaw occurrences, the structure of the model being shown in FIG. 6.

In comparison with the BP model shown in FIG. 5 for predicting the probability of a secure programming rule violation occurring in the software source code 30, the BNN model here may likewise comprise an input layer, a hidden layer and an output layer, wherein each node of the input layer respectively represents the possibility (probability) of a secure programming rule being violated in the code, and each node of the output layer represents the probability (risk) of a CWE security flaw being present in the code. A difference is that the associations between the nodes of the input layer and the hidden layer, and between the nodes of the hidden layer and the output layer, are no longer represented by weighting values, with Gaussian distributions ($\mu$, $\sigma$) being used instead. The learning and training process for the BNN model is essentially the same as that for the BP neural network model, so is not described again here.

- S204: acquiring each item of alert information 44 obtained by analysis of the software source code 30 by a static code scanning tool 60, wherein an item of alert information 44 is used to indicate that a security flaw might occur in a portion of the software source code 30.
- S205: determining a probability 45 of each item of alert information 44 indicating a true security flaw, according to the probability 43, obtained by prediction, of each security flaw that might be present in the software source code 30. The static code scanning tool 60 may be used to analyse the software source code to be assessed, to obtain a list of alerts for security flaws detected by the tool, e.g. each item of alert information 44. In step S203, the software source code 30 was analysed, and a prediction was made regarding the possibility of a security flaw occurring in the code.

In step S205, the two results are combined, to obtain a security flaw alert list with accuracy assessment values. The logic here is very simple: if the probability of a security flaw occurring in the code is high according to the prediction, and at the same time the static scanning tool has issued an alert for it, then the possibility of the alert being accurate is high; conversely, if the possibility of a security risk occurring is low according to the prediction, but the tool has issued an alert, then the possibility of the alert being a false report is high. Equipped with the assessment of alert accuracy, the results of tool checking can be conveniently screened, disregarding a large number of false reports therein, and only dealing with high-credibility alerts. In this way, it is possible to considerably increase the efficiency of code review using tools, and save precious manpower resources and costs during projects.

In some embodiments, there is a computer-readable medium, having stored thereon computer-readable instructions which, when executed by a processor, cause the processor to perform one or more of the software security flaw prediction methods described above. Embodiments of computer-readable media include floppy disks, hard disks, magneto-optical disks, optical disks (e.g. CD-ROM, CD-R, CD-RW, DVD-ROM, DVD-RAM, DVD-RW, DVD+RW), magnetic tapes, non-volatile memory cards and ROM. In some embodiments, computer-readable instructions may be downloaded from a server computer or cloud via a communication network.

Not all of the steps and modules in the procedures and system structural drawings above are necessary; certain steps or modules may be omitted according to actual needs. The order in which the steps are performed is not fixed, and may be adjusted as needed. The system structures described in the embodiments above may be physical structures or logic structures, e.g. some modules might be realized by the same physical entity, or some modules might be realized by multiple physical entities separately or may be realized jointly by certain components in multiple independent devices.

What is claimed is:

1. A software security flaw prediction method comprising:

scanning a segment of software source code to obtain a number of occurrences of each one of multiple error-prone modes present in the software source code;

determining a probability of the software source code violating each one of multiple secure programming rules, based at least in part on the number of occurrences of each error-prone mode;

predicting a probability of each one of multiple security flaws potentially present in the software source code based at least in part on the probability of the software source code violating each secure programming rule;

acquiring each of multiple items of alert information obtained by analysis of the software source code by a static code scanning tool, wherein an item of alert information indicates that a security flaw might occur in the software source code; and determining a probability of each item of alert information indicating a true security flaw, according to the probability of each security flaw potentially present in the software source code.

2. The method as claimed in claim 1, wherein determining the probability of the software source code violating each secure programming rule comprises entering the number of occurrences of each error-prone mode into a pre-trained first neural network model to obtain the probability, as calculated by the first neural network model, of the software source code violating each secure programming rule, wherein the first neural network model indicates a relationship between the number of occurrences of each error-prone mode and the probability of each secure programming rule being violated.

3. The method as claimed in claim 1, wherein predicting the probability of each security flaw potentially present in the software source code comprises entering the probability of the software source code violating each secure programming rule into a pre-trained second neural network model to obtain the probability, as calculated by the second neural model, of occurrence of each security flaw potentially present in the software source code, wherein the second neural network model indicates a relationship between the probability of each secure programming rule being violated and the probability of each flaw.

4. The method as claimed in claim 1, wherein determining the probability of each item of alert information indicating a true security flaw comprises:

if the probability of occurrence of a security flaw potentially present in the software source code is above a threshold, and alert information indicating that said security flaw might occur in the software source code is obtained through analysis of the software source code using the static code scanning tool, then assign the probability of the alert information indicating a true security flaw as high.

5. A software security flaw prediction apparatus comprising:

a code scanning module to scan a number of occurrences of each one of multiple error-prone modes present in a segment of software source code;

a first processing module to determine a probability of the software source code violating each one of multiple secure programming rules based at least in part on the number of occurrences of each error-prone mode;

a second processing module to predict a probability of each one of multiple security flaws that might be present in the software source code according to the probability of the software source code violating each secure programming rule;

an information acquisition module to acquire each one of multiple items of alert information obtained by analysis of the software source code by a static code scanning tool, wherein an item of alert information indicates a potential security flaw in the software source code; and a third processing module to determine a probability of each item of alert information indicating a true security flaw, according to the probability of each security flaw potentially present in the software source code.

6. The apparatus as claimed in claim 5, wherein:

the first processing module is configured to provide the number of occurrences of each error-prone mode into a pre-trained first neural network model to obtain the probability, calculated by the first neural network model, of the software source code violating each secure programming rule; and the first neural network model indicates a relationship between the number of occurrences of each error-prone mode and the probability of each secure programming rule being violated.

7. The apparatus as claimed in claim 5, wherein:

the second processing module is configured to provide the probability of the software source code violating each secure programming rule into a pre-trained second neural network model to obtain the probability, calculated by the second neural model, of occurrence of each security flaw that might be present in the software source code; and the second neural network model indicates a relationship between the probability of each secure programming rule being violated and the probability of each flaw.

8. The apparatus as claimed in claim 5, wherein the third processing module is configured to, if the probability of occurrence of a security flaw potentially present in the software source code is above a threshold, and alert information indicating that said security flaw might occur in the software source code is obtained through analysis of the software source code using the static code scanning tool, then assign the probability of the alert information indicating a true security flaw as high.

9. A software security flaw prediction apparatus comprising:

at least one memory to store computer-readable code;

at least one processor to call the computer-readable code, to:

scan a segment of software source code to obtain a number of occurrences of each one of multiple error-prone modes present in the software source code;

determine a probability of the software source code violating each one of multiple secure programming rules, based at least in part on the number of occurrences of each error-prone mode;

predict a probability of each one of multiple security flaws potentially present in the software source code based at least in part on the probability of the software source code violating each secure programming rule;

acquire each one of multiple items of alert information obtained by analysis of the software source code by a static code scanning tool, wherein an item of alert information indicates that a security flaw might occur in the software source code; and determine a probability of each item of alert information indicating a true security flaw, according to the probability of each security flaw potentially present in the software source code.

* * * * *